United States

[11] 3,604,782

[72] Inventor Marcus John Dore
 Bournemouth, England
[21] Appl. No. 849,760
[22] Filed Aug. 13, 1969
[45] Patented Sept. 14, 1971
[73] Assignee National Research Development Corporation
 London, England
[32] Priority Aug. 16, 1968
[33] Great Britain
[31] 39232/68

[54] ELECTRO-OPTICAL LIGHT DEFLECTION SYSTEMS
 4 Claims, 1 Drawing Fig.
[52] U.S. Cl. ............................................. 350/150, 350/96 B, 350/DIG. 2
[51] Int. Cl. ............................................. G02f 3/00
[50] Field of Search ............................................. 350/96 B, 150, 157, DIG. 2

[56] References Cited
UNITED STATES PATENTS

| | | | |
|---|---|---|---|
| 2,951,736 | 9/1960 | Black | 350/96 X |
| 3,470,320 | 9/1969 | Pike et al. | 350/150 UX |
| 3,493,288 | 2/1970 | Kaufman et al. | 350/150 UX |
| 3,504,958 | 4/1970 | Duinker et al. | 350/150 |
| 3,515,455 | 6/1970 | Kompfner | 350/150 |

Primary Examiner—David Schonberg
Assistant Examiner—Paul R. Miller
Attorney—Cushman, Darby & Cushman ABSTRACT: Electro-optical light deflector apparatus in which electro-optically active deflector stages are used alternately with passive deflector stages comprising arrays of fiber-optic light guides having their input ends close together in a line and their output ends spaced apart.

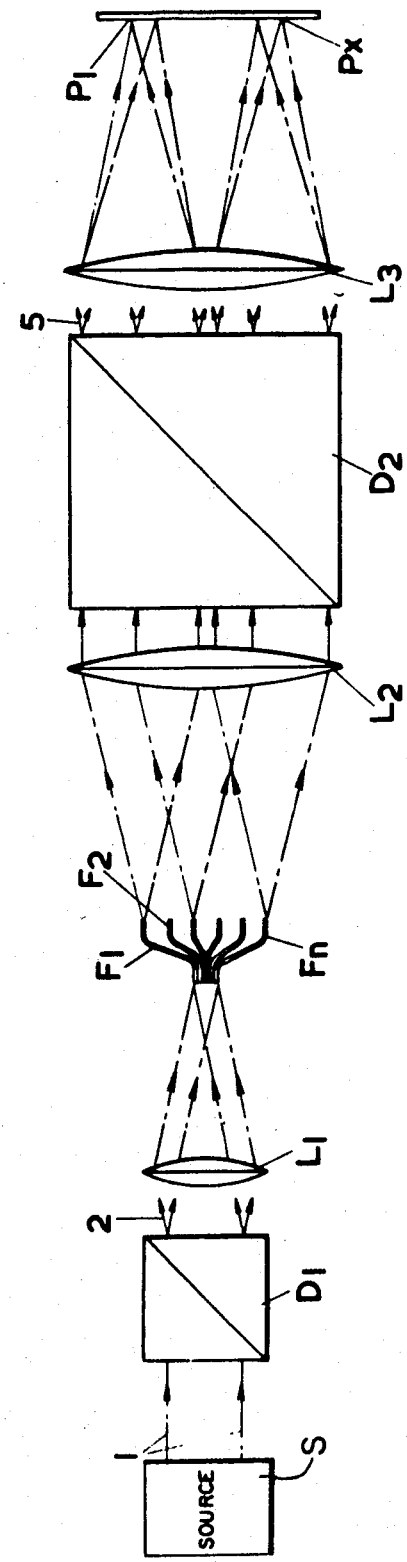

ELECTRO-OPTICAL LIGHT DEFLECTION SYSTEMS

The present invention relates to electro-optical light deflection apparatus capable of deflecting a beam of substantially coherent light to any one of a plurality of positions in response to digital electrical signals. Such light-deflection apparatus may be used, for example, in systems for the storage, processing or display of data signals. For these and other applications it would be useful to have an electro-optic means for deflecting a beam of light, for instance a laser beam, to any one of a multitude of positions forming a line scan. The physical length of the line scan is comparatively unimportant since it can be enlarged or reduced optically. The desirable feature to be achieved is the possibility of deflecting the beam to any one of a large number of distinct, separately resolvable beam positions or spot widths.

Attempts to make electro-optic deflectors capable of scanning over a large number of spot widths have met with various difficulties, and have involved comparatively complicated arrays of a multitude of crystals which must all be accurately aligned. Arrangements comprising sets of electro-optic polarization switches and birefringent deflection elements in series have been used, but they are of inconvenient physical size and of low optical transmissivity as a considerable proportion of the light is absorbed in each of the switches. Moreover in general the signals for producing large deflections are of high power and the deflectors have high electrical capacities, leading to practical limitations on the response time or bandwidth of the deflection-controlling system. Various electro-optical light deflectors, and possible applications for them, have been reviewed by Kulcke et al. and by Fowler et al. in Proceedings of the IEEE, Vol. 54 No. 10 Oct. 1966 pgs. 1419–1429 and 1437–1443 and by Lotspeich in IEEE Spectrum Vol. 5 No. 2 Feb. 1968 pgs. 45–53.

It is an object of the present invention to provide an electro-optical light deflector apparatus which will be capable of producing comparatively large deflections in response to signals of comparatively small power.

According to the present invention there is provided electro-optical light deflector apparatus including a first electrically controllable electro-optical light deflector element capable of deflecting a beam of light to any one of a first plurality of distinct separately resolvable positions in a first output plane, a plurality of fiber-optic light guides having their input ends positioned in an orderly array so that each light guide will receive light directed by the aforesaid first electro-optic light deflector element into an associated separate one of the said separately resolvable positions, and having their output ends spaced apart.

A second electrically controllable electro-optical light deflector element may then be positioned to receive light transmitted through the output ends of the aforesaid light guides and can deflect light received through any one of the light guides, thereby providing means for guiding the light to any one of a second and greater plurality of distinct, separately resolvable positions in a second output plane.

An embodiment of the invention will now be described, by way of example only, with reference to the accompanying DRAWING which is a schematic diagram of an electro-optical light-deflection system, showing some typical light rays therein.

The drawing shows a light source S, directing a collimated coherent beam of light, represented by arrows 1, on to a first electro-optical light deflector element D1. A first electrical deflection signal may be applied to the deflector element D1 to cause the beam of light to be deflected either upwards or downwards (as shown in the drawing), dependent on the magnitude and polarity of the first deflection signal, as indicated diagrammatically by the arrows 2 which represent alternative possible directions of typical emergent rays. A first converging lens L1 is placed to focus the emergent rays in a first output plane in which are placed the input ends of a linear array of fiber-optic light-guides F1, F2, ... Fn. The input ends of the fiber-optic light guides are placed in a straight line as close together as possible, but their output ends are held parallel to each other, equally spaced apart in order in a straight line, in a mount structure which is not shown.

A second converging lens L2 is placed to collect light rays emerging from the output ends of the fiber-optic light-guides F1, F2, ... Fn and to direct them through a second electro-optical light deflector element D2. A second electrical deflection signal may be applied to the element D2 to deflect the rays either upwards or downwards (as shown in the drawing), dependent on the magnitude and polarity of the second deflection signal, as indicated diagrammatically by the arrows 5 which represent alternative possible directions of typical emergent rays. A third converging lens L3 is placed to focus the emergent rays from the second deflector element D2 in a second output plane so that they may illuminate any one of a plurality of spot positions which are equispaced close together in a straight line in the second output plane. These spot positions are consecutively numbered from P1 to P$x$, where $x$ is greater than the number $n$ of light guides F1 to F$n$.

The deflector elements D1 and D2 may be of any known type; the drawing shows them as two-prism deflectors which may be regarded as the simplest form of the iterated-prism deflector described by Lotspeich (IEEE Spectrum 5, 2, Feb. 1968, pp. 48–49). The deflector D1 is capable of deflecting the beam to any one of $n$ separately resolvable spot positions in the first output plane, which positions are $m$ by the input ends of the fiber-optic light-guides F1 to F$n$ inclusive respectively. When the first deflection signal is set to direct the beam on to the light guide F1, the second deflection signal may be set to direct the light on to any one of the first $m$ separately resolvable spot positions P1 to P$m$ in the second output plane. The spacing of the output ends of the fiber-optic light-guides F1 to F$n$ and the arrangement of the system is such that the light may be directed on to any one of the spot positions P($m$+1) to P($2m$) by setting the first deflection signal to direct the light through the light guide F2 and varying the second deflection signal through its range. Similarly, any one of the remaining spot positions P($2m$+1) to P$x$ can be illuminated by applying appropriate deflection signals. Each group of $m$ consecutive spot positions is reached through a separate one of the light guides F1 to F$n$, selected by an associated value of the first deflection signal.

A deflection system as described hereinabove has several advantages. It can be constructed entirely of elements of high optical 2, It gives a deflection range of $x$ equal to $n$ times $m$ separately resolvable spot widths, yet requires deflector elements and deflection signals merely capable of deflections across $n$ and $m$ spot widths. Conveniently $n$ may be equal to $m$ so that $x$ equals $n$ squared.

Additional stages can be provided; for instance the illumination at the spot positions P1 to P$x$ may be incident on the input ends of another set of light guides, whose output ends are spaced apart and feed another deflection stage. Since $n$ and $m$ can be made greater than 2, fewer stages will be required than in a system of the type using polarization-switches which provide only two alternative paths at each stage. In comparison therewith, a system of the kind herein described will generally have fewer interfaces at which reflection losses can occur if $m$ and $n$ are greater than 4. The electro-optical elements can be made of comparatively long and slender crystals using the transverse electro-optic effect, whereas the polarization switches have to be short, using the longitudinal electro-optic effect. The use of the transverse electro-optic effect avoids the need for passing the light through transparent electrodes which absorb or scatter an appreciable proportion of the light; although it may require more signal power than a polarization switch, the power required can be reduced by increasing the length and the slenderness of the crystals. Long crystals can be used without necessarily making the system any longer than an equivalent polarization-switched system, because fewer stages will generally be needed, and the light guides can be provided in a compact form even in the largest deflection stages.

A system as herein described may obviously be used in tandem with another similar system, or with a light-deflecting arrangement of any other kind, to provide deflections in two orthogonal directions.

I claim:

1. Electro-optical light deflector apparatus comprising:
   illumination means for providing a beam of light,
   a first electrically controllable light-deflector means positioned to receive the said beam of light for deflecting the said beam of light to any one of a first plurality of distinct separately resolvable positions in a first output plane, and
   a plurality of fiber-optic light guides, having their input ends positioned in an orderly array so that each of the said fiber-optic light guides will receive light directed by the said light deflector means into an associated separate one of the said separately resolvable positions, and having their output ends spaced apart.

2. Electro-optical light deflector apparatus as claimed in claim 1 and wherein the said electrically controllable light deflector means is capable of deflecting the beam of light to any one of at least three separate positions in the said output plane, and the said plurality of fiber-optic light guides comprises at least three fiber-optic light guides having their input ends respectively positioned in the said at least three separate positions.

3. Electro-optical light deflector apparatus as claimed in claim 1 and comprising a second electrically controllable light deflector means positioned to receive light from the output ends of the said plurality of light guides.

4. Electro-optical light-deflector apparatus as claimed in claim 1 and wherein the said electrically controllable light-deflector means is constructed to operate by the transverse electro-optic effect.